United States Patent
Lee et al.

(10) Patent No.: US 11,504,957 B2
(45) Date of Patent: Nov. 22, 2022

(54) LAMINATING APPARATUS AND METHOD FOR MANUFACTURING VEHICLE SEAT USING ECO-FRIENDLY WATER-BASED ADHESIVE

(71) Applicant: S&B CO., LTD., Gyeongsangbuk-do (KR)

(72) Inventors: Seong Jee Lee, Gyeongsangbuk-do (KR); Jae Keun Sung, Ulsan (KR); Jong Hee Park, Gyeongsangbuk-do (KR); Chong Mi Lee, Ulsan (KR); Jae Kwang Lee, Gyeonggi-do (KR); Seong Jun Park, Gyeonggi-do (KR)

(73) Assignee: S&B CO., LTD.

( * ) Notice: Subject to any disclaimer, the term of this patent is extended or adjusted under 35 U.S.C. 154(b) by 0 days.

(21) Appl. No.: 17/205,924

(22) Filed: Mar. 18, 2021

(65) Prior Publication Data
US 2021/0291505 A1    Sep. 23, 2021

(30) Foreign Application Priority Data
Mar. 19, 2020    (KR) .................. 10-2020-0033860

(51) Int. Cl.
| | | |
|---|---|---|
| B32B 37/00 | (2006.01) | |
| B32B 37/10 | (2006.01) | |
| B32B 37/12 | (2006.01) | |
| B32B 37/20 | (2006.01) | |

(52) U.S. Cl.
CPC .......... B32B 37/0053 (2013.01); B32B 37/10 (2013.01); B32B 37/12 (2013.01); B32B 37/203 (2013.01); B32B 2037/1276 (2013.01); B32B 2605/003 (2013.01)

(58) Field of Classification Search
CPC .................................................. B32B 37/0053
See application file for complete search history.

(56) References Cited

U.S. PATENT DOCUMENTS

| | | | | |
|---|---|---|---|---|
| 5,508,080 | A * | 4/1996 | Sorimachi | B32B 5/06 428/86 |
| 2003/0162454 | A1* | 8/2003 | Kuo | B32B 5/04 442/183 |
| 2016/0257849 | A1* | 9/2016 | Moon | C09D 175/08 |
| 2019/0160799 | A1* | 5/2019 | Lee | B32B 5/024 |

FOREIGN PATENT DOCUMENTS

| | | |
|---|---|---|
| KR | 2002-0001239 A | 1/2002 |
| KR | 10-0515762 B1 | 9/2005 |
| KR | 10-1855924 B1 | 5/2018 |

* cited by examiner

*Primary Examiner* — Francisco W Tschen
*Assistant Examiner* — Abhishek A Patwardhan
(74) *Attorney, Agent, or Firm* — Mendelsohn Dunleavy, P.C.

(57) ABSTRACT

Proposed are a laminating apparatus and a method for manufacturing a vehicle seat. The laminating apparatus includes a first lamination part (100); a second lamination part (200); and a drying part (300), wherein the first lamination part (100) includes: a polyurethane foam feeding roll (110); a first bonding part (120); a fabric feeding roll (130) mounted on a side of the first lamination part (100); and a first pressing part (140), the second lamination part (200) includes: a second application part (210); a backing cloth feeding roll (220); and a second pressing part (230), and the drying part (300) includes: a feed part (310); and a chamber part (320).

6 Claims, 9 Drawing Sheets

FIG. 10

Test Report on Adhesion Strength

| | Fill in | Review | Check |
|---|---|---|---|
| | | | |

Test No. : 2020-02-28-00-02  
Test standard : Lami. peel strength  
Test temperature :  
Client :  
Standard strength :

Test date : 2020-02-28  
Test place : S&B laboratory  
Manufacturer :  
Collection place : Lami. No. 3  
Standard elongation :

| Sample No. | Test angle (deg) | Thickness (mm) | Width (mm) | Length (mm) | Maximum weight (kgf) | M20mm (kgf) | M40mm (kgf) | M60mm (kgf) | M80mm (kgf) | 4P Avr. (kgf) | Total Avr. (kgf) | Judgment |
|---|---|---|---|---|---|---|---|---|---|---|---|---|
| K1 | 90° | 3.00 | 25.00 | 150.00 | 0.333 | 0.223 | 0.266 | 0.206 | 0.261 | 0.244 | 0.225 | PASS |
| K2 | 90° | 3.00 | 25.00 | 150.00 | 0.337 | 0.218 | 0.188 | 0.236 | 0.228 | 0.217 | 0.222 | PASS |
| K3 | 90° | 3.00 | 25.00 | 150.00 | 0.311 | 0.251 | 0.226 | 0.256 | 0.238 | 0.243 | 0.239 | PASS |
| S1 | 90° | 3.00 | 25.00 | 150.00 | 0.293 | 0.234 | 0.171 | 0.253 | 0.214 | 0.220 | 0.221 | PASS |
| S2 | 90° | 3.00 | 25.00 | 150.00 | 0.343 | 0.222 | 0.226 | 0.201 | 0.243 | 0.223 | 0.236 | PASS |
| S3 | 90° | 3.00 | 25.00 | 150.00 | 0.315 | 0.175 | 0.201 | 0.283 | 0.226 | 0.221 | 0.221 | PASS |
| Avr. | | 3.00 | 25.00 | 150.00 | 0.322 | 0.221 | 0.216 | 0.241 | 0.235 | 0.228 | 0.228 | |

Remarks :

S&B CO., LTD.

FIG. 11

| | Fill in | Review | Check |
|---|---|---|---|
| Test Report on Adhesion Strength | | | |

Test No.: 2020-02-28-00-03  
Test standard: Pur peel strength  
Test temperature:  
Client:  
Standard strength:

Test date: 2020-02-27  
Test place: S&B laboratory  
Manufacturer:  
Collection place: Lami. No.  
Standard elongation:

| Sample No. | Test angle (deg) | Thickness (mm) | Width (mm) | Length (mm) | Maximum weight (kgf) | M20mm (kgf) | M40mm (kgf) | M60mm (kgf) | M80mm (kgf) | 4P Avr. (kgf) | Total Avr. (kgf) | Judgment |
|---|---|---|---|---|---|---|---|---|---|---|---|---|
| K1 | 90° | 1.00 | 1.00 | 1.00 | 0.626 | 0.503 | 0.552 | 0.471 | 0.529 | 0.514 | 0.535 | PASS |
| K2 | 90° | 1.00 | 1.00 | 1.00 | 0.948 | 0.633 | 0.328 | 0.459 | 0.216 | 0.559 | 0.572 | PASS |
| K3 | 90° | 1.00 | 1.00 | 1.00 | 0.788 | 0.561 | 0.707 | 0.558 | 0.656 | 0.625 | 0.615 | PASS |
| S1 | 90° | 1.00 | 1.00 | 1.00 | 0.779 | 0.519 | 0.598 | 0.674 | 0.534 | 0.576 | 0.612 | PASS |
| S2 | 90° | 1.00 | 1.00 | 1.00 | 0.631 | 0.424 | 0.476 | 0.491 | 0.624 | 0.504 | 0.504 | PASS |
| S3 | 90° | 1.00 | 1.00 | 1.00 | 0.639 | 0.383 | 0.433 | 0.566 | 0.619 | 0.515 | 0.501 | PASS |
| Avr. | | 1.00 | 1.00 | 1.00 | 0.734 | 0.507 | 0.524 | 0.537 | 0.528 | 0.549 | 0.540 | |

Remarks: K2

S&B CO., LTD.

FIG. 12

Test Report on Adhesion Strength

| | Fill in | Review | Check |
|---|---|---|---|
| | | | |

Test No. : 2020-02-28-00-04  
Test standard : Water-based peel strength  
Test temperature :  
Client :  
Standard strength :

Test date : 2020-02-28  
Test place : S&B laboratory  
Manufacturer :  
Collection place : Lami. No. 3  
Standard elongation :

| Sample No. | Test angle (deg) | Thickness (mm) | Width (mm) | Length (mm) | Maximum weight (kgf) | M20mm (kgf) | M40mm (kgf) | M60mm (kgf) | M80mm (kgf) | 4P Avr. (kgf) | Total Avr. (kgf) | Judgment |
|---|---|---|---|---|---|---|---|---|---|---|---|---|
| K1 | 90° | 1.00 | 1.00 | 1.00 | 0.863 | 0.509 | 0.754 | 0.495 | 0.633 | 0.598 | 0.609 | PASS |
| K2 | 90° | 1.00 | 1.00 | 1.00 | 0.808 | 0.488 | 0.671 | 0.736 | 0.749 | 0.676 | 0.649 | PASS |
| K3 | 90° | 1.00 | 1.00 | 1.00 | 1.000 | 0.879 | 0.587 | 0.534 | 0.608 | 0.620 | 0.623 | PASS |
| S1 | 90° | 1.00 | 1.00 | 1.00 | 0.794 | 0.658 | 0.671 | 0.703 | 0.437 | 0.617 | 0.547 | PASS |
| S2 | 90° | 1.00 | 1.00 | 1.00 | 0.789 | 0.591 | 0.707 | 0.558 | 0.656 | 0.626 | 0.515 | PASS |
| S3 | 90° | 1.00 | 1.00 | 1.00 | 1.015 | 0.582 | 0.828 | 0.722 | 0.858 | 0.698 | 0.707 | PASS |
| Avr. | | 1.00 | 1.00 | 1.00 | 0.877 | 0.617 | 0.738 | 0.634 | 0.567 | 0.639 | 0.625 | |

Remarks : K3

S&B CO., LTD.

LAMINATING APPARATUS AND METHOD FOR MANUFACTURING VEHICLE SEAT USING ECO-FRIENDLY WATER-BASED ADHESIVE

CROSS REFERENCE TO RELATED APPLICATION

The present application claims priority to Korean Patent Application No. 10-2020-0033860, filed Mar. 19, 2020, the entire contents of which is incorporated herein for all purposes by this reference.

BACKGROUND OF THE INVENTION

Field of the Invention

The present disclosure relates to a laminating apparatus and a method for manufacturing a vehicle seat using an eco-friendly water-based adhesive. More particularly, the present disclosure relates to a laminating apparatus and a method for manufacturing a vehicle seat using a water-based adhesive which is eco-friendly and has excellent adhesive performance.

Description of the Related Art

There have been studies on various bonding methods for maintaining functional characteristics of seats, headliners, door trims, etc., which are conventionally used for vehicle interiors, for as long as possible in preparation for frequent use.

For example, such methods include a flame lamination method in which the surface of sponge is melted with a flame and the resulting adhesive is applied to a base material, followed by pressurizing (Korean Patent No. 10-1276931), and a polyurethane reactive (PUR) hot melt lamination method in which a PUR hot melt adhesive is applied to sponge and dried, followed by heating and pressurizing together with leather (Korean Patent Application No. 10-1996-0017143, and Korean Patent No. 10-1855924). By the use of these various methods, a polyurethane foam is bonded to fabric (woven fabric, synthetic fabric, leather: PU leather, TPU leather, etc.), followed by bonding of backing cloth, film, non-woven fabric, or SD coating.

FIG. 1 is a schematic view illustrating an apparatus for manufacturing a vehicle seat using a flame lamination method, and FIG. 2 is a schematic view illustrating an apparatus for manufacturing a vehicle seat using a PUR lamination method. FIG. 3 is a schematic cross-sectional image illustrating vehicle seats manufactured using the flame lamination and PUR lamination methods.

Referring to FIGS. 1 and 3, the flame lamination method using a flame is a method that is excellent in terms of production cost and efficiency. However, during flame lamination, carbon monoxide (CO) and hydrogen cyanide (HNC) are generated due to the incomplete burning of a polyurethane foam, causing problems in the working environment and atmosphere. In addition, amine gas generated while carbonizing the polyurethane foam with the flame may cause discoloration (yellowing) of woven fabrics, odor, volatile organic compound (VOC) generation, and environmental pollution. Moreover, due to the reduction in thickness due to the carbonization of the polyurethane foam, loss of material cost and shrinkage at the hot melt bonding temperature may occur. In particular, as illustrated in FIG. 3, folding and wrinkles may occur after lamination.

Referring to FIGS. 2 and 3, the PUR lamination method can solve the problem of the generation of CO and HNC due to the incomplete burning of the polyurethane foam during flame lamination. However, there is a limit to removing carbon dioxide ($CO_2$), toluene diisocyanate (TDI), amine, etc. that are latent in the polyurethane foam, which may be a factor that causes headaches due to odors when purchasing a new vehicle. In addition, due to high manufacturing costs, the PUR hot melt lamination method is not applied to woven fabrics and synthetic fabrics, and thus, its application is currently limited to real leather bonding methods. Moreover, as illustrated in FIG. 3, a PUR adhesive is also problematic in production efficiency depending on the curing time of the adhesive because it is difficult to recover hardness and fold wrinkles depending on the degree of hardness of the polyurethane foam after curing.

Therefore, there is a high need for an eco-friendly technology capable of solving such problems of related-art bonding methods and maximizing production efficiency.

The foregoing is intended merely to aid in the understanding of the background of the present disclosure, and is not intended to mean that the present disclosure falls within the purview of the related art that is already known to those skilled in the art.

Documents of Related Art (Patent document 1) Korean Patent No. 10-1276931
(Patent document 2) Korean Patent Application No. 10-1996-0017143
(Patent document 3) Korean Patent No. 10-1855924

SUMMARY OF THE INVENTION

Accordingly, the present disclosure has been made keeping in mind the above problems occurring in the related art, and an objective of the present disclosure is to provide a laminating apparatus for manufacturing a vehicle seat using an eco-friendly water-based adhesive.

Another objective of the present disclosure is to provide a method for manufacturing a laminate vehicle seat using an eco-friendly water-based adhesive.

In order to achieve the above objectives, according to one aspect of the present disclosure, there is provided a laminating apparatus for manufacturing a vehicle seat, the laminating apparatus including: a first lamination part; a second lamination part; and a drying part, wherein the first lamination part may include:
a polyurethane foam feeding roll configured to feed a polyurethane foam;
a first bonding part configured to apply a first water-based adhesive to a first surface of the fed polyurethane foam;
a fabric feeding roll mounted on a side of the first lamination part at a position spaced apart from the polyurethane foam feeding roll, and configured to feed fabric; and
a first pressing part configured to primarily press the fed fabric and the polyurethane foam applied with the first water-based adhesive to manufacture a pressed polyurethane foam, the second lamination part may include:
a second application part configured to apply a second water-based adhesive to the first surface of the pressed polyurethane foam;
a backing cloth feeding roll configured to feed a backing cloth; and a second pressing part configured to secondarily press the fed backing cloth and the pressed polyurethane foam applied with the second water-based adhesive to manufacture a pressed backing cloth, and the drying part may include:

a feed part configured to feed the pressed backing cloth at a predetermined angle with respect to a moving direction; and a chamber part configured to dry the fed pressed backing cloth.

In the first lamination part, the first bonding part may include:

a pair of first application rolls composed of a fixed roll and a gap roll that are configured to be equally controlled and are spaced apart from each other at a predetermined distance;

a comma knife configured to control an amount of application of the first water-based adhesive; and an application width automatic control guide configured to control an application width of the first water-based adhesive, wherein the distance between the fixed roll and the gap roll may be 80 to 95% of a thickness of the polyurethane foam.

The comma knife may be mounted on the fixed roll at a distance of 0.5 to 2 mm.

In the first lamination part, the first pressing part may include a pair of first pressing rolls composed of a gap roll and a fixed roll that are configured to be equally controlled and are spaced apart from each other at a predetermined distance, wherein the distance between the gap roll and the fixed roll may be 1.5 to 5 mm.

In the second lamination part, the second application part may include:

a pair of second application rolls composed of a gap roll and a fixed roll that are configured to be equally controlled and are spaced apart from each other at a predetermined distance; and a comma knife configured to control an amount of application of the second water-based adhesive, wherein the distance between the gap roll and the fixed roll may be 80 to 95% of a thickness of the pressed polyurethane foam.

The comma knife may be mounted on the fixed roll at a distance of 0.1 to 2 mm.

In the second lamination part, the second pressing part may include a pair of second pressing rolls composed of a fixed roll and a gap roll that are configured to be equally controlled and spaced apart from each other at a predetermined distance, wherein the distance between the fixed roll and the gap roll may be 80 to 95% of thicknesses of the fabric and the polyurethane foam.

Each of the first and second water-based adhesives may be obtained by using at least one selected from the group consisting of acrylic emulsion resin, chloroprene rubber, urethane emulsion resin, ethylene-vinyl acetate emulsion resin, epoxy emulsion resin, vinyl acetate emulsion resin, aqueous polymer-isocyanate-based resin, styrene-butadiene rubber solution-based resin, styrene-butadiene rubber-based latex, nitrile rubber-based resin, and nitrocellulose-based resin.

The drying part may include:

the feed part configured to feed the pressed backing cloth at an angle of 20 to 60° with respect to the moving direction;

the chamber part including at least one hot air nozzle and a suction ventilation fan that are configured to dry the fed pressed backing cloth by means of hot air; and a final pressing roll.

According to another aspect of the present disclosure, there is provided a method of manufacturing a laminate vehicle seat, the method including:

(S1) applying a first water-based adhesive to a first surface of a polyurethane foam fed from a polyurethane foam feeding roll;

(S2) primarily pressing fabric fed from a fabric feeding roll and the polyurethane foam applied with the first water-based adhesive to manufacture a pressed polyurethane foam;

(S3) applying a second water-based adhesive to the first surface of the pressed polyurethane foam;

(S4) secondarily pressing a backing cloth fed from a backing cloth feeding roll and the pressed polyurethane foam applied with the second water-based adhesive to manufacture a pressed backing cloth;

(S5) feeding the pressed backing cloth at a predetermined angle with respect to a moving direction; and (S6) drying the fed pressed backing cloth.

In step (S1), the first water-based adhesive may be applied to the first surface of the polyurethane foam fed from the polyurethane foam feeding roll using a pair of application rolls, and a ratio of driving speed between the polyurethane foam feeding roll and the pair of first application rolls may be 1:1.

In step (S2), the fabric fed from the fabric feeding roll and the polyurethane foam applied with the first water-based adhesive may be primarily pressed using a pair of first pressing rolls, and a driving speed of the fabric feeding roll may be slower by 0.3 to 1.5 RPM than that of the pair of first pressing rolls.

In step (S4), the backing cloth fed from the backing cloth feeding roll and the pressed polyurethane foam applied with the second water-based adhesive may be secondarily pressed using a pair of second pressing rolls, and a driving speed of the backing cloth feeding roll may be slower by 0.3 to 1.5 RPM than that of the pair of second pressing rolls.

In step (S5), the pressed backing cloth may be fed at an angle of 20 to 60° with respect to the moving direction.

In step (S6), in order to remove moisture from the first water-based adhesive and the second water-based adhesive and leave only solids, the pressed backing cloth may be dried by means of hot air under conditions of an airflow velocity of 50 to 200 CMM (m$^3$/min), an air pressure of 30 to 80 mmAQ, and a temperature of 90 to 180° C.

In step (S6), after the drying of the pressed backing cloth, final pressing may be performed using a final pressing roll, and final pressing conditions may be controlled so that peel strength may be equal to or greater than 0.5 kgf on the basis of HKMC Spec. of the Hyundai-Kia Motor Company (HKMC) standards.

According to the present disclosure, by using the laminating apparatus for manufacturing the vehicle seat using the eco-friendly water-based adhesive, it is possible to manufacture a laminate vehicle seat that has excellent probe tack properties, maintains soft properties even after curing thus causing no wrinkles, and is excellent in properties of cold resistance, heat shrinkage resistance, shear adhesion failure temperature, and durability.

In addition, it is possible to manufacture a laminate vehicle seat that is eco-friendly and has excellent cost competitiveness by maximizing production efficiency.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 10 is a test report on adhesion strength (peel strength) after flame lamination according to the related art;

FIG. 11 is a test report on adhesion strength (peel strength) after PUR lamination according to the related art; and FIG. 12 is a test report on adhesion strength (peel strength) after lamination of the laminate vehicle seat according to the present disclosure.

DETAILED DESCRIPTION OF THE INVENTION

Figure 1:
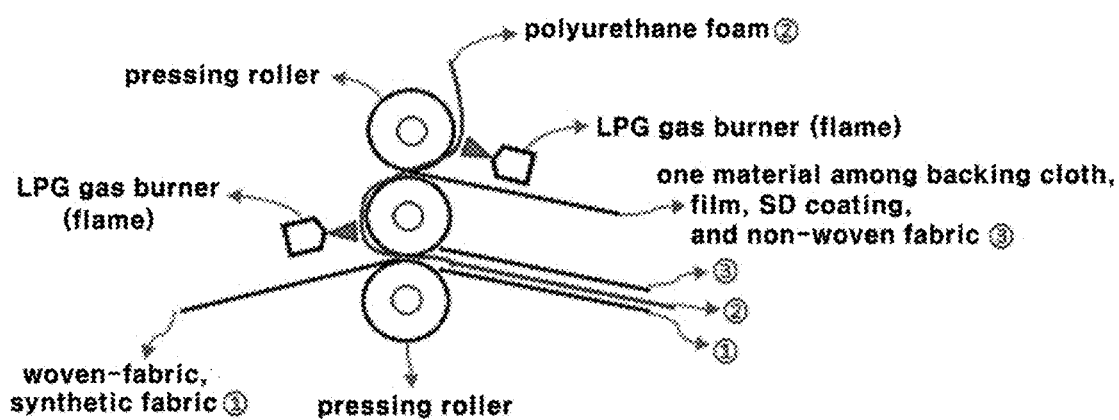
FIG. 1 is a schematic view illustrating an apparatus for manufacturing a vehicle seat using a flame lamination method according to the related art.
Figure 2:
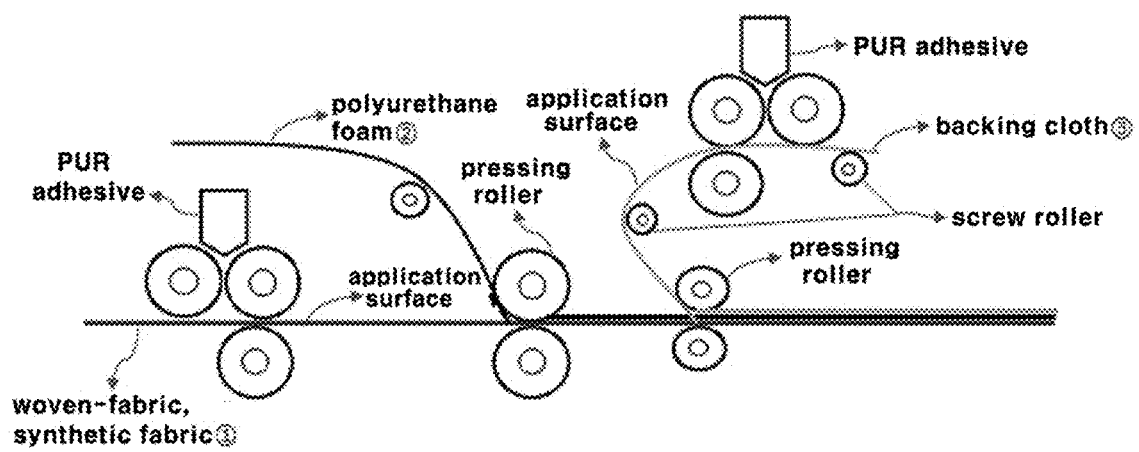
FIG. 2 is a schematic view illustrating an apparatus for manufacturing a vehicle seat using a PUR lamination method according to the related art.

Hereinbelow, exemplary embodiments of the present disclosure will be described in detail with reference to the accompanying drawings. Throughout the drawings, the same reference numerals will refer to the same or like parts.

Figure 4:
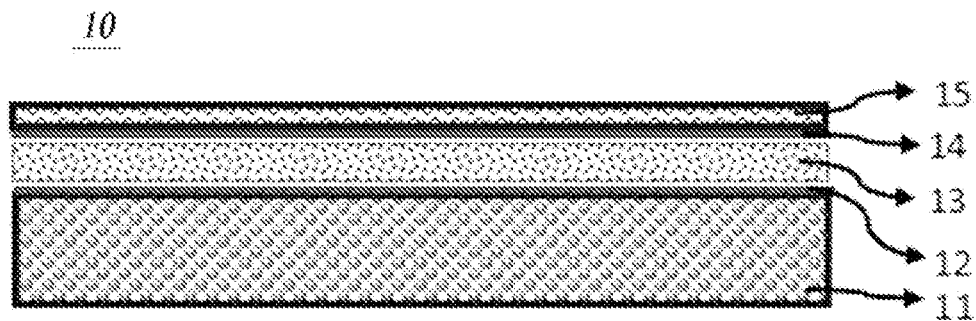
FIG. 4 is a schematic cross-sectional view illustrating a laminate vehicle seat manufactured according to an embodiment of the present disclosure.

FIG. 4 is a schematic cross-sectional view illustrating a laminate vehicle seat manufactured according to the present disclosure.

Referring to FIG. 4, a laminate vehicle seat 10 according to an embodiment of the present disclosure has a configuration in which a first water-based adhesive 12 is applied on a fabric 11, a polyurethane foam 13 is bonded on the first water-based adhesive 12 using a first pressing process, a second water-based adhesive 14 is applied on the polyurethane foam 13, and a backing cloth 15 is bonded on the second water-based adhesive 14 using a second pressing process.

In the present disclosure, through two lamination and drying processes using an eco-friendly water-based adhesive, it is possible to manufacture a laminate vehicle seat that has excellent probe tack properties, maintains soft properties even after curing thus causing no wrinkles, and is excellent in properties of cold resistance, heat shrinkage resistance, shear adhesion failure temperature, and durability.

In this regard, a laminating apparatus according to the present disclosure is configured by sequentially connecting a first lamination part 100, a second lamination part 200, and a drying part 300.

Figure 5A:
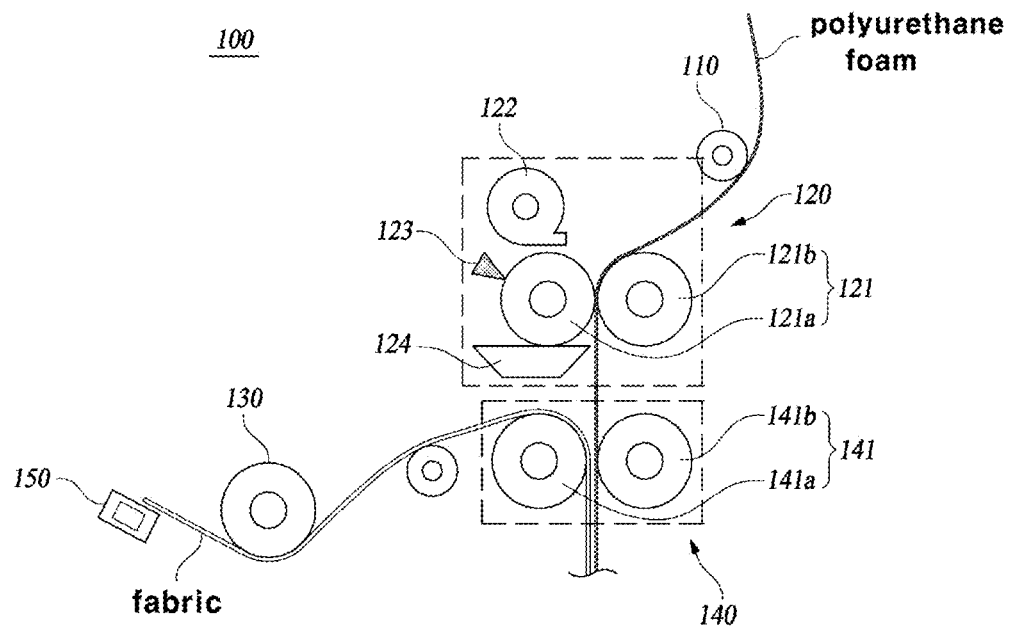
FIG. 5A is a schematic view illustrating a first lamination part of a laminating apparatus for manufacturing a vehicle seat according to an embodiment of the present disclosure.
Figure 5B:
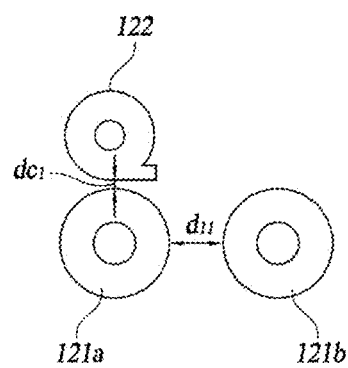
FIGS. 5B and 5C are partially enlarged views thereof.
Figure 5C:
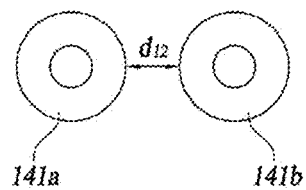

FIG. 5A is a schematic view illustrating a first lamination part 100 of a laminating apparatus for manufacturing a vehicle seat according to an embodiment of the present disclosure, and FIGS. 5B and 5C are partially enlarged views thereof.

Referring to FIG. 5, the first lamination part 100 includes:

a polyurethane foam feeding roll 110 configured to feed the polyurethane foam;

a first bonding part 120 configured to apply a first water-based adhesive to a first or first and second surfaces of the fed polyurethane foam;

a fabric feeding roll 130 mounted on a side of the first lamination part 100 at a position spaced apart from the polyurethane foam feeding roll 110, and configured to feed fabric; and a first pressing part 140 configured to primarily press the fed fabric and the polyurethane foam applied with the first water-based adhesive to manufacture a pressed polyurethane foam.

The first bonding part 120 may include:

a pair of first application rolls 121 composed of a fixed roll 121a and a gap roll 121b that are configured to be equally controlled and are spaced apart from each other at a predetermined distance;

a comma knife 122 configured to control the amount of application of the first water-based adhesive; and an application width automatic control guide 123 configured to control an application width of the first water-based adhesive.

Specifically, in the first bonding part 120, the pair of first application rolls 121 is composed of the fixed roll 121a and the gap roll 121b. The comma knife 122 and a solvent tank 124 may be provided in the vicinity of the fixed roll 121a so that the adhesive may be applied to the first surface of the polyurethane foam, and a pressing process may be performed on the second surface of the polyurethane foam using the gap roll 121b.

The pair of first application rolls 121 are required to be controlled in the gap therebetween according to the thickness of the polyurethane foam. Specifically, a distance d11 between the pair of first application rolls 121, i.e., between the fixed roll 121a and the gap roll 121b, may be 80 to 95% of the thickness of the polyurethane foam. The distance d11 between the fixed roll 121a and the gap roll 121b may be controlled by controlling the position of the gap roll 121b.

When the distance d11 therebetween is smaller than the above range, there is a concern that the polyurethane foam may be damaged. On the other hand, when distance d11 therebetween is larger than the above range, as the amount of the adhesive penetrating into the polyurethane foam during the first pressing process increases, the thickness of the polyurethane foam may decrease after adhesion and curing, which is not desirable. Specifically, the distance d11 may be 85 to 95% of the thickness of the polyurethane foam.

In the present disclosure, the comma knife 122 may be mounted on the fixed roll 121a at a distance dc1 of 0.5 to 2 mm to control the amount of application of the first water-based adhesive. When the distance dc1 of the comma knife 122 is too small beyond the above range, adhesion strength is weakened. On the other hand, when the distance dc1 thereof is too large, the thickness of the polyurethane foam may decrease regardless of the distance between the pair of first application rolls 121. Specifically, the distance dc1 may be 1 to 1.5 mm.

In the present disclosure, when an adhesive application width of the polyurethane foam is larger or smaller than a fabric width, the adhesive may stain the fabric and thus cause fabric contamination. Therefore, the application width of the first water-based adhesive may be controlled through the application width automatic control guide 123.

Specifically, the application width automatic control guide 123 may be operated in conjunction with a fabric width detection sensor 150 so that the application width of the first water-based adhesive may become the same as the fabric width and the adhesive application width of the polyurethane foam.

The first pressing part 140 includes a pair of first pressing rolls 141 configured to be equally controlled and spaced apart from each other at a predetermined distance. The pair of first pressing rolls 141 is composed of a gap roll 141a and a fixed roll 141b. A distance d12 between the pair of first pressing rolls 141, i.e., between the gap roll 141a and the fixed roll 141b, may be 1.5 to 5 mm regardless of the thicknesses of the fabric and the polyurethane foam. The distance d12 between the gap roll 141a and the fixed roll 141b may be controlled by controlling the position of the gap roll 141a.

The degree of pressing is determined according to the distance d12, so that a difference may occur in peel strength. Therefore, when the distance d12 is smaller than the above range, there is a concern that the fabric and the polyurethane foam may be damaged. On the other hand, when the distance d12 is larger than the above range, pressing is not properly performed, which is not desirable. Specifically, the distance d12 may be 2 to 4 mm.

As described above, the application width automatic control guide 123 may be operated in conjunction with a fabric width detection sensor 150 so that the application width of the first water-based adhesive may become the same as the fabric width and the adhesive application width of the polyurethane foam.

When the fabric width and the adhesive application width of the polyurethane foam are the same, the first water-based adhesive does not stain the gap roll 141a during pressing by the fixed roll 141b. On the other hand, when the adhesive application width of the polyurethane foam is larger or smaller than the fabric width, the adhesive may stain the fabric and thus cause fabric contamination.

Figure 6A:
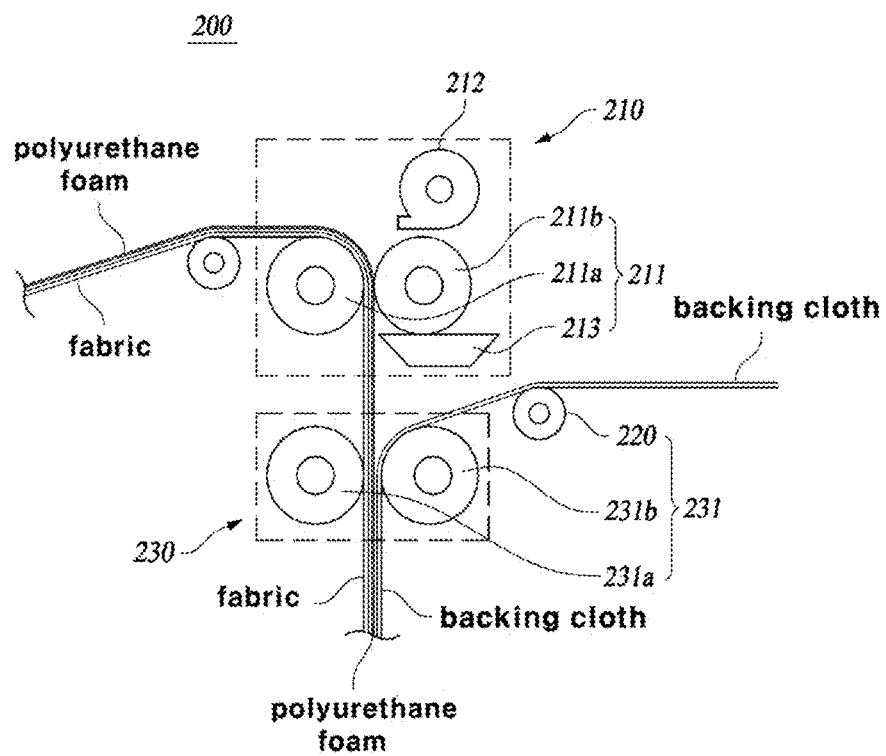
FIG. 6A is a schematic view illustrating a second lamination part of the laminating apparatus for manufacturing the vehicle seat according to the embodiment of the present disclosure.
Figure 6B:
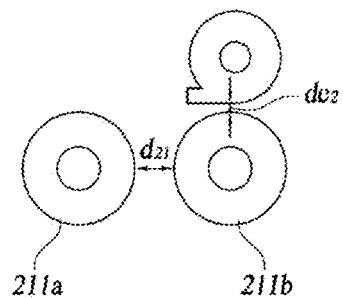
FIGS. 6B and 6C are partially enlarged views thereof.
Figure 6C:
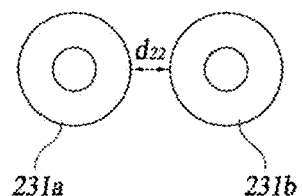
Figure 7:
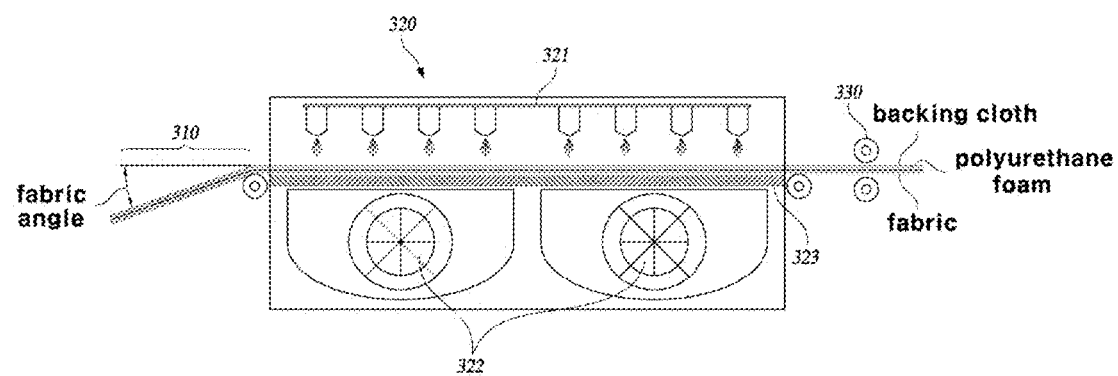
FIG. 7 is a schematic view illustrating a drying part of the laminating apparatus for manufacturing the vehicle seat according to the embodiment of the present disclosure.

FIG. 6A is a schematic view illustrating a second lamination part 200 of the laminating apparatus for manufacturing the vehicle seat according to the embodiment of the present disclosure, and FIGS. 6B and 6C are partially enlarged views thereof.

Referring to FIG. 6, the second lamination part 200 includes:

a second application part 210 configured to apply a second water-based adhesive to the first or first and second surfaces of the pressed polyurethane foam;

a backing cloth feeding roll 220 configured to feed a backing cloth; and a second pressing part 230 configured to secondarily press the fed backing cloth and the pressed polyurethane foam applied with the second water-based adhesive to manufacture a pressed backing cloth.

The second application part 210 may include:

a pair of second application rolls 211 composed of a gap roll 211a and a fixed roll 211b that are configured to be equally controlled and are spaced apart from each other at a predetermined distance.

Specifically, in the second application part 210, the pair of second application rolls 211 is composed of the gap roll 211a and the fixed roll 211b. A comma knife 212 and a solvent tank 213 may be provided in the vicinity of the fixed roll 211b so that the adhesive may be applied to the first surface of the pressed polyurethane foam, and a pressing process may be performed on the second surface of the pressed polyurethane foam using the gap roll 211a.

The pair of second application rolls 211 are required to be controlled in the gap therebetween according to the thickness of the polyurethane foam. Specifically, a distance d21 between the pair of second application rolls 211, i.e., between the gap roll 211a and the fixed roll 211b, may be 80 to 95% of the thickness of the pressed polyurethane foam. When the distance d21 therebetween is smaller than the above range, there is a concern that the polyurethane foam may be damaged. On the other hand, when distance d21 therebetween is larger than the above range, as the amount of the adhesive penetrating into the polyurethane foam during the first pressing process increases, the thickness of the polyurethane foam may decrease after adhesion and curing, which is not desirable.

Specifically, the distance d21 may be 85 to 95% of the thickness of the pressed polyurethane foam.

In the present disclosure, the comma knife 212 may be mounted on the fixed roll 211b at a distance dc2 of 0.1 to 2 mm to control the amount of application of the second water-based adhesive. When the distance dc2 of the comma knife 212 is too small beyond the above range, adhesion strength is weakened. On the other hand, when the distance dc2 thereof is too large, the thickness of the polyurethane foam may decrease regardless of the distance between the pair of second application rolls 211. Specifically, the distance dc2 may be 1 to 1.5 mm.

The second pressing part 230 includes a pair of second pressing rolls 231 configured to be equally controlled and spaced apart from each other at a predetermined distance. The pair of second pressing rolls 231 is composed of a fixed roll 231a and a gap roll 231b. A distance d22 between the pair of second pressing rolls 231, i.e., between the fixed roll 231a and the gap roll 231b, may be 80 to 95% of the thicknesses of the fabric and the polyurethane foam. That is, the distance d22 may be 80 to 95% of the sum of the thickness of the fabric and the thickness of the polyurethane foam. The degree of pressing is determined according to the distance d22, so that a difference may occur in peel strength. Therefore, when the distance d22 is smaller than the above range, there is a concern that the fabric and the polyurethane foam may be damaged. On the other hand, when the distance d22 is larger than the above range, the second water-based adhesive oozes out on the surface of the backing cloth, and thus the second water-based adhesive stains the surface of the gap roll 231b, which may cause contamination and peeling of the backing cloth, which is not desirable. Specifically, the distance d22 may be 85 to 95% of the thicknesses of the fabric and the polyurethane foam.

In the present disclosure, as the first water-based adhesive and the second water-based adhesive, water-based adhesives that have no odor and in which no VOCs are detected in a solvent itself may be used, and may be the same or different from each other.

Each of the water-based adhesives may be formed by using, for example, at least one selected from the group consisting of acrylic emulsion resin, chloroprene rubber, urethane emulsion resin, ethylene-vinyl acetate emulsion resin, epoxy emulsion resin, vinyl acetate emulsion resin, aqueous polymer-isocyanate-based resin, styrene-butadiene rubber solution-based resin, styrene-butadiene rubber-based latex, nitrile rubber-based resin, and nitrocellulose-based resin.

In an example, each of the water-based adhesives may be obtained by using a composition including the chloroprene rubber and the acrylic emulsion resin, and may have a solid content of 30 to 40%, a viscosity of 1000 to 3000 mpa·s/20° C., and a pH of 7 to 11.

In another example, each of the water-based adhesives may be obtained by using a composition including the urethane emulsion resin, and may have a solid content of 30 to 40%, a viscosity of equal to or greater than 10,000, a PH of 6 to 9, and a density of 0.5 to 3 g/cm$^3$.

The drying part 300 includes:

a feed part 310 configured to feed the pressed backing cloth at a predetermined angle with respect to a moving direction; and a chamber part 320 configured to dry the fed pressed backing cloth.

The present disclosure can effectively remove organic compounds such as $CO_2$, TDI, and amine contained in the polyurethane foam through drying, thereby manufacturing a vehicle seat that is harmless to the human body.

Specifically, the drying part 300 may include: the feed part 310 configured to feed the pressed backing cloth at an angle of 20 to 60° with respect to the moving direction;

the chamber part 320 including at least one hot air nozzle 321 and a suction ventilation fan 322 that are configured to dry the fed pressed backing cloth by means of hot air; and a final pressing roll 330.

In the present disclosure, for effective drying, the pressed backing cloth may be fed at an angle of 20 to 60° with respect to the moving direction. When the angle thereof is smaller than the above range, fold wrinkles may occur on the surface of the fabric (woven fabric, synthetic fabric) depending on the thickness of the polyurethane foam and the elongation of the backing cloth. On the other hand, when the angle thereof is larger than the above range, frictional slip against the fabric may occur, which is not desirable.

The number of hot air nozzles 321 is not limited, but may be 5 to 15, for example.

The suction ventilation fan 322 may be configured to suck organic compounds and odors discharged from the polyurethane foam and discharge the same to a dust collection facility to perform related processes in an eco-friendly manner.

In some cases, the backing cloth may be moved on a mesh belt 323 in the chamber part 320 to increase the drying effect, and final pressing may be performed on the final pressing roll 330 to solve the problem of backing cloth peeling and adhesive ooze.

On the other hand, the present disclosure provides a method of manufacturing a laminate vehicle seat using the laminating apparatus for manufacturing the vehicle seat.

Specifically, the method of manufacturing the laminate vehicle seat may include:

a first application step (S1) of applying a first water-based adhesive to a first surface of a polyurethane foam fed from a polyurethane foam feeding roll 110;

a first pressing step (S2) of first pressing fabric fed from a fabric feeding roll 130 and the polyurethane foam applied with the first water-based adhesive to manufacture a pressed polyurethane foam;

a second application step (S3) of applying a second water-based adhesive to the first surface of the pressed polyurethane foam;

a second pressing step (S4) of second pressing a backing cloth fed from a backing cloth feeding roll 220 and the pressed polyurethane foam applied with the second water-based adhesive to manufacture a pressed backing cloth;

a feed step (S5) of feeding the pressed backing cloth at a predetermined angle with respect to a moving direction; and a drying step (S6) of drying the fed pressed backing cloth.

In step (S1), the first water-based adhesive is applied to the first surface of the polyurethane foam fed from the polyurethane foam feeding roll 110 using a pair of first application rolls 121, and in order to prevent the polyurethane foam from rolling during lamination according to the thickness, density, and hardness, and elongation of each specification, the ratio of driving speed between the polyurethane foam feeding roll 110 and the pair of first application rolls 121 may be 1:1.

In step (S2), the fabric fed from the fabric feeding roll 130 and the polyurethane foam applied with the first water-based adhesive are primarily pressed using a pair of first pressing rolls 141.

In this case, the driving speed of the fabric feeding roll 130 may be slower by 0.5 to 1 RPM than that of the pair of first pressing rolls 141. When the driving speed thereof is out of the above range, the fabric may be pushed or wrinkled during pressing.

In step (S4), the backing cloth fed from the backing cloth feeding roll 220 and the pressed polyurethane foam applied with the second water-based adhesive are secondarily pressed using a pair of second pressing rolls 231. In this case, the driving speed of the backing cloth feeding roll 220 may be slower by 0.3 to 1.5 RPM than that of the pair of second pressing rolls 231. When the driving speed thereof is out of the above range, the fabric may be pushed or wrinkled during pressing. Specifically, the driving speed of the backing cloth feeding roll 220 may be slower by 0.5 to 1 RPM than that of the pair of second pressing rolls 231.

In step (S5), the pressed backing cloth may be fed at an angle of 20 to 60° with respect to the moving direction. When the angle thereof is smaller than the above range, fold wrinkles may occur on the surface of the fabric (woven fabric, synthetic fabric) depending on the thickness of the polyurethane foam and the elongation of the backing cloth. On the other hand, when the angle thereof is larger than the above range, frictional slip against driving rollers may occur, which is not desirable. Specifically, the backing cloth may be fed at an angle of 30 to 50° with respect to the moving direction.

In step (S6), in order to remove moisture from the first water-based adhesive and the second water-based adhesive and leave only solids, the pressed backing cloth may be dried by means of hot air using hot air nozzles 321 under conditions of an airflow velocity of 50 to 200 CMM (m$^3$/min), an air pressure of 30 to 80 mmAQ, and a temperature of 90 to 180° C. Thereafter, using a suction ventilation fan 322, organic compounds such as $CO_2$, TDI, and amine, and odors contained in the polyurethane foam may be sucked and discharged to a dust collection facility, so that the process can be performed in an eco-friendly manner. With such hot air drying, a water-based adhesive solvent, etc. oozing out of the backing cloth during second backing cloth pressing is quickly dried so that only solids remain on an application surface of the polyurethane foam, thereby improving adhesion performance.

The above process may be performed in a chamber part 320, and the backing cloth is moved therein using a mesh belt 323, so that organic compounds and other odors contained in the polyurethane foam can be effectively discharged.

Thereafter, an additional pressing step may be performed using a final pressing roll 330, so that backing cloth peeling due to a decrease in adhesive force and adhesive ooze appearing on the surface of the backing cloth can be prevented. Specifically, after the drying of the pressed backing cloth, final pressing is performed using the final pressing roll 330, and final pressing conditions may be controlled so that peel strength is equal to or greater than 0.5 kgf on the basis of HKMC Spec. of the Hyundai-Kia Motor Company (HKMC) standards, and specifically, the peel strength is equal to or greater than 0.6 kgf.

Hereinafter, the present disclosure will be described in detail through examples, but the following example and experimental example are only illustrative of one embodiment of the present disclosure. Thus, the scope of the present disclosure is not limited by the following example and experimental example.

EXAMPLE

In the present disclosure, a first water-based adhesive and a second water-based adhesive having the following compositions were used.

A liquid water-based adhesive (appearance: colored viscous liquid, solid content: about 34%, viscosity: about 2,000 mpa·s/20° C., pH: 7 to 11) based on a chloroprene rubber (CR) and an acrylic emulsion resin, and a water-based PU adhesive (main raw material: polyurethane, appearance: milky white liquid, solid content: 40±1%, viscosity: equal to or greater than 10,000, PH: 6 to 9, density: 1.062 g/cm$^3$) were used.

Experimental Example

Figure 8:
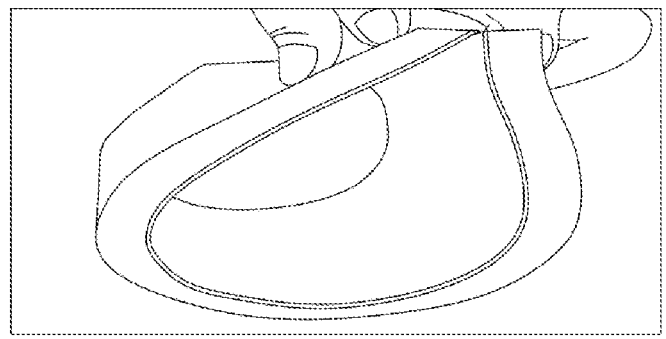
FIG. 8 is a cross-sectional image illustrating a laminate vehicle seat manufactured according to the present disclosure.

FIG. 8 illustrates a cross-sectional image of a laminate vehicle seat according to the present disclosure.

Figure 3:
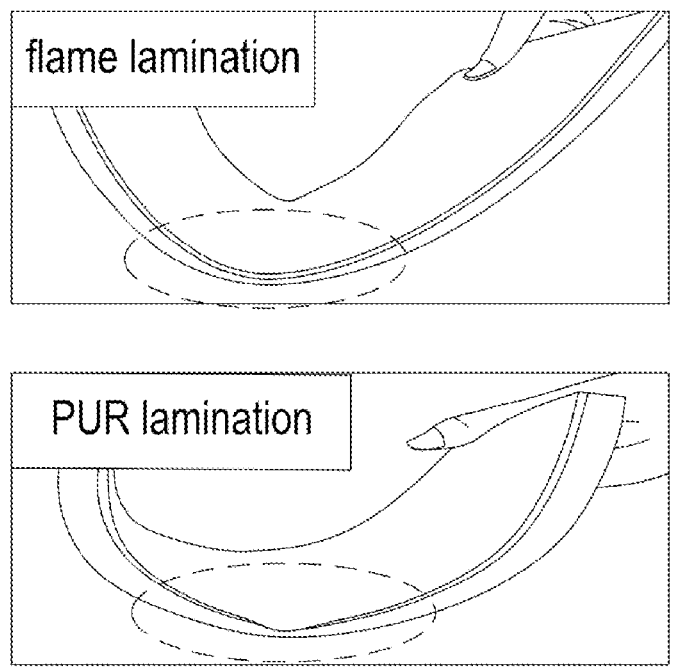
FIG. 3 is a schematic cross-sectional image illustrating vehicle seats manufactured using the flame lamination and PUR lamination methods according to the related art.

Referring back to FIG. 3, it can be found that the laminate vehicle seat according to the present disclosure did not cause wrinkles and folding compared to vehicle seats manufactured using related-art flame lamination and PUR lamination methods according to FIG. 3.

Figure 9A:
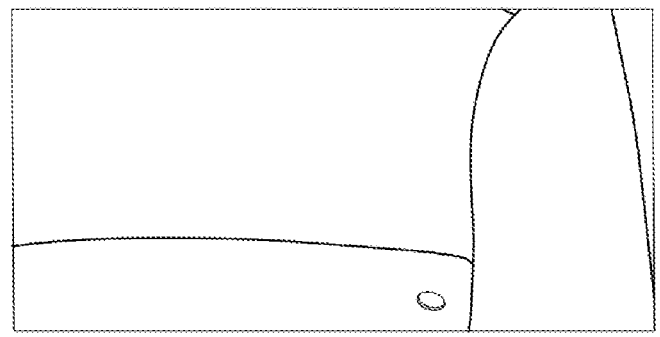
FIG. 9A is an image illustrating the appearance of the laminate vehicle seat manufactured according to the present disclosure.
Figure 9B:
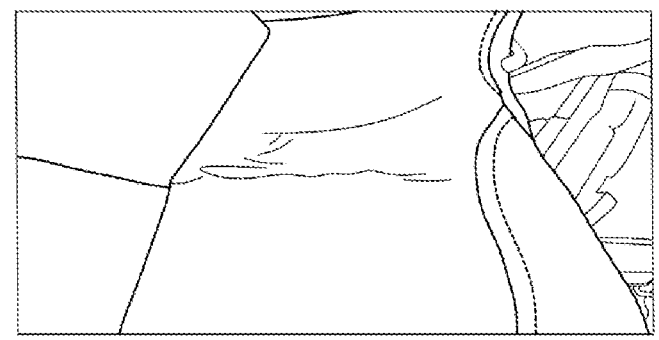
FIG. 9B is an image illustrating the appearance of a vehicle seat manufactured using the flame lamination method or the PUR lamination method according to the related art.

In addition, FIG. 9A illustrates an image of the appearance of the laminate vehicle seat manufactured according to the present disclosure. It can be found that wrinkles and folding did not caused compared to a vehicle seat manufactured using the related-art flame lamination or PUR lamination method according to FIG. 9B.

A comparative test on adhesion strength (peel strength) between related-art flame lamination and PUR lamination, and lamination of the laminate vehicle seat according to the present disclosure is illustrated in FIGS. 10 to 12.

Referring to FIGS. 10 to 12, on the basis of HKMC Spec. of the Hyundai-Kia Motor Company (HKMC) standards, peeling strength after flame lamination (see FIG. 10) was a total of 0.228 kgf, peeling strength after PUR lamination (see FIG. 11) was a total of 0.540 kgf, and peeling strength after lamination according to the present disclosure (see FIG. 12) was a total of 0.625 kgf. Thus, it can be found that the present disclosure exhibited excellent peel strength.

Although the exemplary embodiments of the present disclosure have been described for illustrative purposes, those skilled in the art will appreciate that various modifications, additions and substitutions are possible, without departing from the scope and spirit of the present disclosure as disclosed in the accompanying claims.

What is claimed is:

1. A method of manufacturing a laminate vehicle seat, the method comprising:
  (S1) applying a first water-based adhesive to a first surface of a polyurethane foam fed from a polyurethane foam feeding roll (110);
  (S2) primarily pressing fabric fed from a fabric feeding roll (130) and the polyurethane foam applied with the first water-based adhesive to manufacture a pressed polyurethane foam;
  (S3) applying a second water-based adhesive to a second surface of the pressed polyurethane foam;
  (S4) secondarily pressing a backing cloth fed from a backing cloth feeding roll (220) and the pressed polyurethane foam applied with the second water-based adhesive to manufacture a pressed backing cloth;
  (S5) feeding the pressed backing cloth at a predetermined angle with respect to a moving direction; and
  (S6) drying the fed pressed backing cloth,
  wherein said method further comprises any one of the following conditions (A)-(D):
  (A) wherein in step (S1), the first water-based adhesive is applied to the first surface of the polyurethane foam fed from the polyurethane foam feeding roll (110) using a pair of application rolls (121), and a ratio of driving speed between the polyurethane foam feeding roll (110) and the pair of first application rolls (121) is 1:1
  (B) wherein in step (S2), the fabric fed from the fabric feeding roll (130) and the polyurethane foam applied with the first water-based adhesive are primarily pressed using a pair of first pressing rolls (141), and a driving speed of the fabric feeding roll (130) is slower by 0.3 to 1.5 RPM than that of the pair of first pressing rolls (141);
  (C) wherein in step (S4), the backing cloth fed from the backing cloth feeding roll (220) and the pressed polyurethane foam applied with the second water-based adhesive are secondarily pressed using a pair of second pressing rolls (231), and a driving speed of the backing cloth feeding roll (220) is slower by 0.3 to 1.5 RPM than that of the pair of second pressing rolls (231); and
  (D) wherein in step (S6), in order to remove moisture from the first water-based adhesive and the second water-based adhesive and leave only solids, the pressed backing cloth is dried by means of hot air under conditions of an airflow velocity of 50 to 200 CMM (m$^3$/min), an air pressure of 30 to 80 mmAQ, and a temperature of 90 to 180° C.

2. The method of claim 1, wherein in step (S1), the first water-based adhesive is applied to the first surface of the polyurethane foam fed from the polyurethane foam feeding roll (110) using a pair of application rolls (121), and
  a ratio of driving speed between the polyurethane foam feeding roll (110) and the pair of first application rolls (121) is 1:1.

3. The method of claim 1, wherein in step (S2), the fabric fed from the fabric feeding roll (130) and the polyurethane foam applied with the first water-based adhesive are primarily pressed using a pair of first pressing rolls (141), and a driving speed of the fabric feeding roll (130) is slower by 0.3 to 1.5 RPM than that of the pair of first pressing rolls (141).

4. The method of claim 1, wherein in step (S4), the backing cloth fed from the backing cloth feeding roll (220) and the pressed polyurethane foam applied with the second water-based adhesive are secondarily pressed using a pair of second pressing rolls (231), and a driving speed of the backing cloth feeding roll (220) is slower by 0.3 to 1.5 RPM than that of the pair of second pressing rolls (231).

5. The method of claim 1, wherein in step (S6), in order to remove moisture from the first water-based adhesive and the second water-based adhesive and leave only solids, the pressed backing cloth is dried by means of hot air under conditions of an airflow velocity of 50 to 200 CMM ($m^3$/min), an air pressure of 30 to 80 mmAQ, and a temperature of 90 to 180° C.

6. The method of claim 1, wherein in step (S6), after the drying of the pressed backing cloth, final pressing is performed using a final pressing roll (330), and final pressing conditions are controlled so that peel strength is equal to or greater than 0.5 kgf on the basis of HKMC Spec. of the Hyundai-Kia Motor Company (HKMC) standards.

\* \* \* \* \*